United States Patent [19]
Watanabe

[11] Patent Number: 5,255,521
[45] Date of Patent: Oct. 26, 1993

[54] GAS CYCLE ENGINE FOR REFRIGERATOR

[75] Inventor: Norihisa Watanabe, Hiratsuka, Japan

[73] Assignee: Sumitomo Heavy Industries, Ltd., Tokyo, Japan

[21] Appl. No.: 892,360

[22] Filed: Jun. 2, 1992

[30] Foreign Application Priority Data

Jun. 13, 1991 [JP] Japan .................. 3-44427[U]

[51] Int. Cl.$^5$ .............................................. F25B 9/00
[52] U.S. Cl. ................................................ 62/6; 60/520
[58] Field of Search .................................. 62/6; 60/520

[56] References Cited

U.S. PATENT DOCUMENTS

| | | | |
|---|---|---|---|
| 4,121,124 | 10/1978 | Hunt | 310/13 |
| 4,121,125 | 10/1978 | Dölz | 310/27 |
| 4,642,995 | 2/1987 | Bachler et al. | 62/6 |
| 4,945,269 | 7/1990 | Kamm | 310/15 |

FOREIGN PATENT DOCUMENTS

| | | |
|---|---|---|
| 62-138659 | 6/1987 | Japan . |
| 63-148055 | 6/1988 | Japan . |
| 2-29556 | 1/1990 | Japan . |

OTHER PUBLICATIONS

Article entitled "Review of the Oxford Cryocooler" by G. Davey, Published in Advances in Cryogenic Engineering, vol. 35, pp. 1423–1431.

Article entitled "New Generation of Split, Closed-Cycle, Cryogenic Coolers for Infrared System" by Daniel Lehrfeld, Published in Infrared Phys., vol. 23, No. 2, pp. 77–84, 1983.

Article entitled "Mechanical Coolers: An Option for Space Cryogenic Cooling Applications" by C. Jewell and B. G. Jones, Published in European Space Agency, Bulletin No. 52, May 1990, pp. 79–85.

Paper entitled "Performance of the Philips USFA Stirling Cycle Cooler" given at the International Cryocooler Conference on Aug. 18–19, 1988 present by R. J. de Putter, pp. 205–213 [Publication and Date of Publication unknown].

Paper entitled "A Small Free-Piston Stirling Refrigerator" given at the Intersociety Energy Conversion Engineering Conference, and published in the American Chemical Society, vol. 14, No. 1, pp. 1136–1141, 1979.

Publication entitled "Oxford Stirling Cooler Technical Overview" by Dr. R. G. Ross, Jr. Published Oct. 10, 1989 by Jet Propulsion Laboratory, California Institute of Technology, Pasadena, Calif.

Publication entitled "Outline of Melco's Cooler"—Mitsubishi, Apr. 1990 Prepared for NASA and prepared by Melco—12 pages.

Lockheed Palo Alto Research Laboratory, Palo Alto, California and Lucas Aerospace Limited, Birmingham, England—Presentation to Mitsubishi Electric Corporation (Melco) entitled "Cryocooler Capabilities for Short Wave Infrared Radiometer for EOS-1" (14 pages) [Authtor, Publication and Date of Publication unknown].

Article entitled "Split Stirling Cycle Cryogenic Cooler for Infra-Red Detectors", Published by Mechanical Equipment, British Aerospace, Herts. United Kingdom [Author, Publication and Date of Publication unknown].

Primary Examiner—Ronald C. Capossela
Attorney, Agent, or Firm—Frishauf, Holtz, Goodman & Woodward

[57] ABSTRACT

A gas cycle engine for a small-sized, low-vibration and long-life refrigerator which is high in centering accuracy of a moving member and excellent in durability. In the gas cycle engine for such a refrigerator, a thermodynamic gas cycle is performed by using a moving member (2 and 3) disposed in a cylinder (1), supported by leaf springs so as to be movable in the axial direction of the cylinder and driven by a linear motor (9, 12 and 13), the leaf springs (4a and 4b) being made of an electrical conductor used also as current leads for supplying a current to the linear motor.

30 Claims, 4 Drawing Sheets

GAS CYCLE ENGINE FOR REFRIGERATOR

BACKGROUND OF THE INVENTION

1. Field of the Invention

The present invention relates to a refrigerator, and particularly relates to a gas cycle engine for a small-sized, low-vibration and long-life refrigerator.

Apparatus such as an infrared image device requires a small-sized refrigerator for the purposes of reduction of thermal noise, improvement of performance, and the like. For such purposes, a Stirling refrigerator using an inverse-Stirling cycle is used widely. The Stirling refrigerator will be described hereinafter as an example, but the present invention is not limited to the Stirling refrigerator.

2. Description of the Related Art

A conventional Stirling refrigerator will be described hereunder with reference to FIGS. 3A and 3B.

FIG. 3A shows the basic structure of the conventional Stirling refrigerator. The Stirling refrigerator has a compressor 51, an expander 52, and a communicating fluid line 53 for connecting the compressor 51 and the expander 52 to each other. The compressor 51 includes a cylinder 56, and a piston 57 which reciprocates within the cylinder to define a compression chamber 58 between the cylinder 56 and the piston 57. The expander 52 includes a displacer 61 provided in another cylinder 59 so as to be able to reciprocate within the cylinder 59. A regenerative heat exchanger 62 is contained in the displacer 61. The regenerative heat exchanger 62 has a gas passage for making a high-temperature orifice 64 communicate with a low-temperature orifice 65. Gas passing through the gas passage is subjected to heat exchange in the regenerative heat exchanger 62. An expansion chamber 66 is defined between the cylinder 59 and the low-temperature end of the displacer 61. Though not shown, the piston 57 is elastically supported by a spring or an equivalent, if necessary and driven by a prime mover with crank mechanism or by a linear motor. The displacer 61 is supported by a spring or an equivalent so as to be elastically movable. The piston 57 and the displacer 61 reciprocate in a state of out-of phase to perform an inverse-Stirling cycle.

The principle of operation of the inverse-Stirling cycle is constituted by the four strokes of isothermal compression, isochoric transfer, isothermal expansion and isochoric transfer of refrigerant gas.

Specifically, it is now assumed that the displacer 61 is initially placed in a neutral position by a spring. When the piston 57 moves to the right in the drawing, refrigerant gas flows into the expander 52 through the fluid passage 53 while isothermally compressed in the compression chamber 58. At this time, the displacer 61 moves to the side of the expansion chamber 66 because of the fluid resistance force of the gas passing through the regenerative heat exchanger 62 from the high-temperature orifice 64 to the low-temperature orifice 65. That is, as the space volume of the expansion chamber 66 decreases, the operating pressure of the whole system reaches its maximum. The process up to this condition is of the isothermal compression.

When the piston 57 has reached the right end, there is no flow of gas. Thus, pressure is balanced between the compression chamber 58 and the expansion chamber 66, and the fluid resistance force does not act. Therefore, the displacer 61 tends to return to the initial neutral position by the spring, and compressed gas moves to the compression chamber 58. Approximately, this process can be deemed as an isochoric transfer which means that compressed gas has moved to the expansion chamber 66 in the condition that there is no change in volume. In this condition, the refrigeration of refrigerant gas does not yet occur.

When the piston 57 is reversed to the leftward as in the initial state, approximately the displacer 61 simultaneously moves to the left because of the fluid resistance force acting on the displacer 61. At this time, the space volume of the expansion chamber 66 increases and the pressure thereof decreases. Thus, expansion occurs. That is, this state can be deemed as an isothermal expansion (in which heat should be absorbed from the outside for achieving an isothermal expansion). Thus, refrigeration occurs.

At the time when the piston 57 has reached the left extreme point, the displacer 61 tends to return to the initial neutral position by the spring because there is no action of fluid resistance force. The gas in the expansion chamber 66 may be transferred isochorically. That is, the refrigerated gas in the expansion chamber 66 returns to the compression chamber 58 via the low-temperature orifice 65, the regenerative heat exchanger 62 and the high-temperature orifice 64, thus completing the four-stroke cycle. In practice, perfect isothermal condition as described above is not always obtained in the respective strokes in the actual operation of the refrigerator.

Because the expansion chamber 66 is used as a source of cold or refrigeration in the aforementioned Stirling refrigerator, an object to be refrigerated is disposed at and thermally connected to the expansion chamber 66. For example, an infrared imaging device is placed at the righthand end of the expander 52. When, for example, the infrared imaging device vibrates by 10 μm, the resulting image will become foggy and blurry. Therefore, low vibration is required for the refrigerator. Further, a long life is required for the refrigerator.

In the structure shown in FIG. 3A, both the piston 57 of the compressor 51 and the displacer 61 of the expander 52 reciprocate and form sources of vibration.

A proposal has been made in which a pair of expanders are arranged in opposition to each other so as to put the object therebetween in order to reduce expander vibration (as disclosed in Japanese Patent Laid-Open Nos. Sho-62-138659 and Hei-2-29556).

Even if such expander vibrations could be prevented, the vibration of the Stirling refrigerator as a whole would not be cleared away as long as the compressor could transmit vibration. As measures to reduce the compressor vibration, a proposal has been made in which a pair pistons are driven by linear motors without crankshaft and are arranged symmetrically to each other (as disclosed in Japanese Patent Laid-Open No. Sho-63-148055).

An example of the structure of the linear motor driven symmetric piston type compressor is shown in FIG. 3B. Two identical pistons 57a and 57b are arranged symmetrically to each other in a cylinder 56 to define a compression chamber 58 therebetween. A yoke 72 having an H-shaped section is arranged around the cylinder 56.

As shown in the sectional view of FIG. 3B, the yoke 72 is constituted by two coaxial cylindrical members and a flange-like member for connecting these cylindrical members with each other. That is, the yoke 72 forms cylindrical spaces both in the left hand side and in the right hand side in the drawing. Further, a gas passage for connecting the compression chamber 58 to the outside is provided in the center portion of the yoke. A pair of ring-shaped permanent magnets 71a and 71b are connected on the internal surface of the outer cylindrical member of the yoke 72. That is, the permanent magnet 71a and the lefthand side portion of the yoke 72 constitute one magnetic circuit, and the permanent magnet 71b and the righthand side portion of the yoke 72 constitute another magnetic circuit.

These magnetic circuits form a pair of magnetic gaps 73a and 73b between the permanent magnets 71a, 71b and the inner cylindrical portion of the yoke 72, respectively. A pair of cylindrical moving coils 74a and 74b are inserted into the pair of magnetic gaps, respectively. An alternating electric current is supplied to the pair of moving coils 74a and 74b through lead wires 75a and 75b. The pair of moving coils 74a and 74b are mechanically connected to the pistons 57a and 57b, which are disposed symmetrically in the cylinder, so that the pistons 57a and 57b are driven by forces acting on the pair of moving coils 74a and 74b, respectively.

The pistons 57a and 57b are linearly driven by linear motors constituted by the moving coils 74a and 74b, the permanent magnets 71a and 71b and the yoke 72. Accordingly, each of the pistons does not receive a force acting in a direction perpendicular to the direction of the movement of the piston, compared with the case of crank driving. As a result, not only the life span of bearings and sealings for the pistons is prolonged but vibration is reduced. Further, because the pistons 57a and 57b move in opposition direction, forces from the two pistons cancel each other to reduce vibration.

Heretofore, the support pistons and displacers has been given by coil springs or equivalents. In recent years, supporting of a moving member by a leaf spring or springs has been developed. FIG. 4 shows an example of the Stirling refrigerator in which moving members are supported by parallel leaf springs.

An opposite piston type compressor 51 shown in the lower half of the drawing is connected, through a communication pipe 53, to an expander 52 shown in the upper half of the drawing. In the compressor 51, pistons 57a and 57b are disposed in opposition to each other and driven by shafts 81a and 81b, respectively. Moving coils 74a and 74b are connected to the shafts 81a and 81b and inserted into gaps of magnetic circuits constituted by permanent magnets 71a and 71b and yokes 72a and 72b, respectively.

The shafts 81a and 81b are supported by an outer casing through two pairs of leaf springs (82a, 83a) and (82b, 83b), each being made of disk-shaped thin elastic metal diaphragm. These leaf springs 82 and 83 elastically allow displacements of the shafts 81a and 81b in the axial direction. An electric current is supplied to the moving coils 74a and 74b through lead wires 75a and 75b, respectively.

In this structure, the expander 52 connected through the communication pipe 53 to the compressor 51 also has a driving mechanism constituted by a linear motor. That is, a shaft 84 for supporting a displacer 61 having a regenerative heat exchanger 62 is supported by the outer casing through diaphragm-shaped leaf springs 85 and 86 and mechanically connected to a moving coil 88.

The moving coil 88 is disposed in a magnetic gap of a magnetic circuit constituted by a permanent magnet 89 and a yoke 90, so that the moving coil 88 produces a force in the axial direction when a current passes through the moving coil 88. The current is supplied to the moving coil 88 through lead wires 91. By using such disk-shaped leaf springs, it is possible to support the pistons and displacers on the axis of movement with high accuracy and it is possible to inhibit the displacement in the direction perpendicular to the axis of movement. Accordingly, the abrasion or wearing-off of piston sealings or equivalents can be reduced greatly.

Further, when the aforementioned centering guide mechanism is employed, compression pistons can be supported in a non-contact manner. Further, clearance sealing for providing a narrow gap between a piston and a cylinder to eliminate the physical sealings and to reduce the quantity of gas leakage as much as possible can be used for prevention of leakage.

SUMMARY OF THE INVENTION

An object of the present invention is to provide a gas cycle engine for a refrigerator, which is high in centering accuracy of moving members and excellent in durability.

According to an aspect of the present invention, provided is a gas cycle engine for use in a refrigerator, comprising moving members arranged in a cylinder so as to be driven by a linear motor to perform a thermodynamic gas cycle, the moving members being supported by leaf spring means so as to be movable in the direction of an axis of movement, the leaf spring means being made of an electrical conductor so that the leaf spring means are used also as current leads for supplying a current to the linear motor.

Although the problem of abrasion or wearing-off and slide resistance has been solved remarkably by employing the centering mechanism with leaf springs in the conventional refrigerator-use gas cycle engine using a linear motor, there arises another problem in that lead wires deteriorate and break down because of the fatigue cycle when the gas cycle engine is operated for a long term since the current to the moving coils is supplied through the lead wires. Therefore, sufficient durability cannot be secured in the conventional gas cycle engine.

The fatigue of the current supply system is caused mainly by metal fatigue due to repetition of deformation of the lead wires. By using leaf springs which are used as a mechanism for supporting the moving members also as current leads, not only the moving members can be supported on the axis with high accuracy but current leads except the leaf springs can be made free from deformation. For example, the life span of the current supply system can be prolonged by forming the leaf springs of a good electrical conductor such as phosphor bronze, beryllium copper, or the like.

According to the present invention, current lead wires which are repetitively deformed can be omitted by using the leaf springs also as the current supply system, so that the refrigerator-use gas cycle engine can be improved both in durability and in reliability.

BRIEF DESCRIPTION OF THE DRAWINGS

FIGS. 3A and 3B show a conventional technique, in which: FIG. 3A is a sectional view showing the basic structure of a Stirling refrigerator; and FIG. 3B is a schematic sectional view showing an example of the structure of an opposite piston type compressor.

DESCRIPTION OF THE PREFERRED EMBODIMENTS

Figure 1:
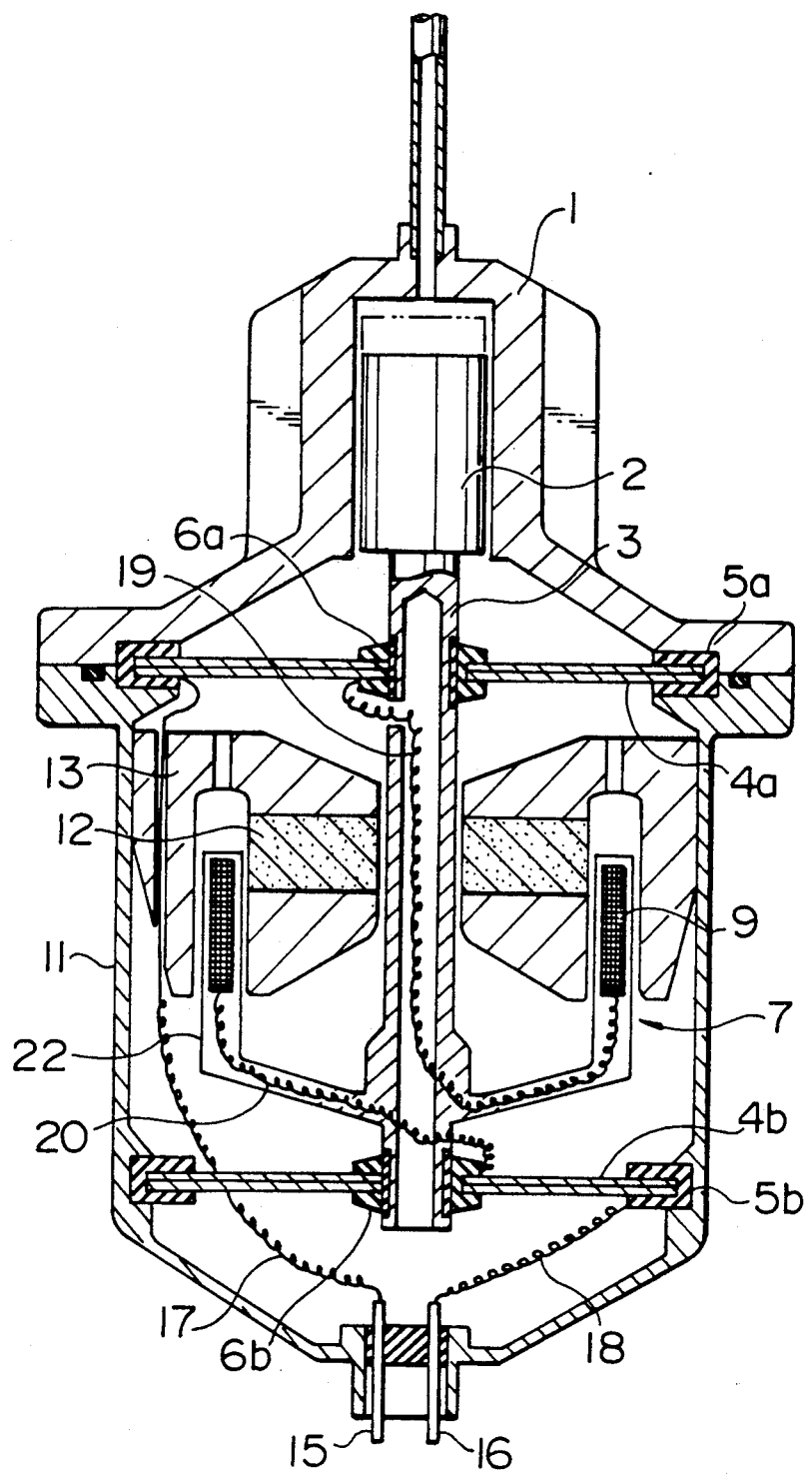
FIG. 1 is a sectional view showing the structure of a Stirling refrigerator-use compressor according to an embodiment of the present invention.

FIG. 1 is a schematic sectional view showing the compressor portion of a Stirling refrigerator. A compression piston 2 is arranged in a cylinder 1. A shaft 3 for driving the compression piston 2 is supported by an outer casing 11 through a pair of leaf springs 4a and 4b. The drive shaft 3 has a hollow structure to allow reduction of the weight thereof and lead wires be contained therein.

Each of the leaf springs 4a and 4b comprises a lamination of two leaf springs. The outer circumferential portions of the leaf springs 4a and 4b are covered with electrically insulating members 5a and 5b made of ceramics, respectively. In the case where the drive shaft 3 is constituted by an electrical conductor such as a metal, the inner circumferential portions of the leaf springs 4a and 4b are also electrically insulated by electrical insulating members 6a and 6b.

A magnetic circuit comprising by a permanent magnet 12 and a yoke 13 made of a magnetic material is disposed within the outer casing 11 and forms a cylindrical magnetic gap 7. A moving coil 9 is positioned in the magnetic gap 7 and mechanically connected to the drive shaft 3 through a coupling member 22 such as an arm.

A hermetic sealing is formed in an end of the outer casing 11 using hermetic terminals 15 and 16 for supplying electric power. Lead wires 17 and 18 extend from the hermetic terminals 15 and 16 to the outer circumferential portions of the pair of leaf springs 4a and 4b, respectively and are fixed at the position. Further, lead wires extend from the inner circumferential portions of the leaf springs 4a and 4b to the driving coil. These lead wires are fixed with respect to the driving shaft 3 and the coupling member 22. For example, the coupling member 22 is provided with a cavity to allow the lead wires 19 and 20 to pass therethrough.

Because the lead wires 17 to 20 are free from deformation, the metal fatigue thereof little occurs. The current supply from the outer circumferential portions to the inner circumferential portions of the elastically movable supporting leaf springs 4a and 4b is made by the supporting leaf springs 4a and 4b themselves. Each of the supporting leaf springs 4a and 4b is preferably made of an elastic metal material such as beryllium copper good in electrical conducting characteristic. It is preferable to provide a slit or slits of appropriate shape in disk-shaped leaf springs to increase the quantity of displacement of the leaf springs in the axial direction, to reduce the quantity of displacement in the radial direction and to reduce the metal fatigue caused by displacement or distortion. The slits may preferably be shaped rotationally symmetric (i.e., the slits exhibit radial symmetry) about the shaft.

Figure 3A:
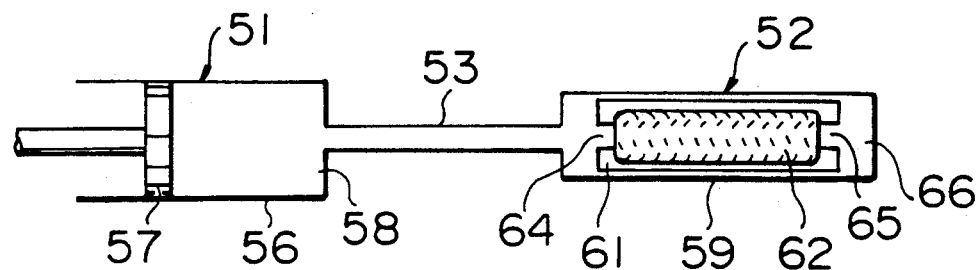
Figure 3B:
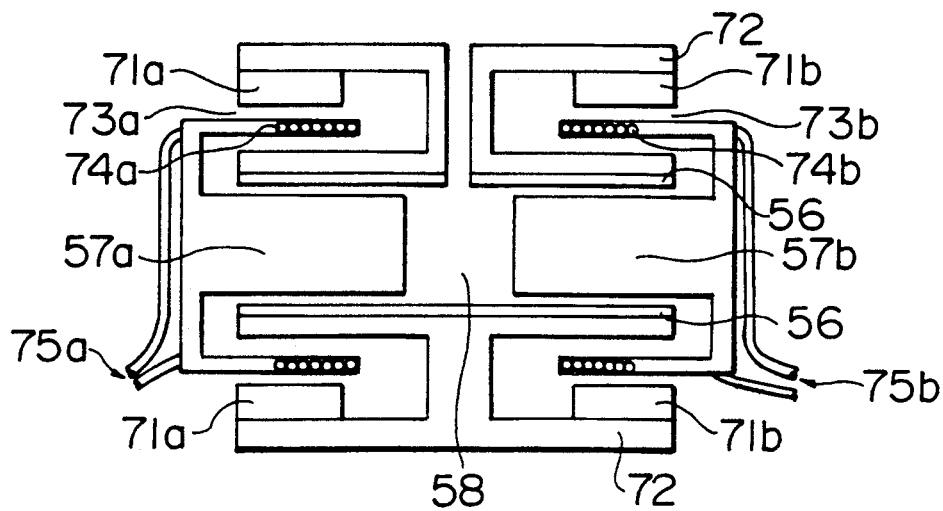
Figure 4:
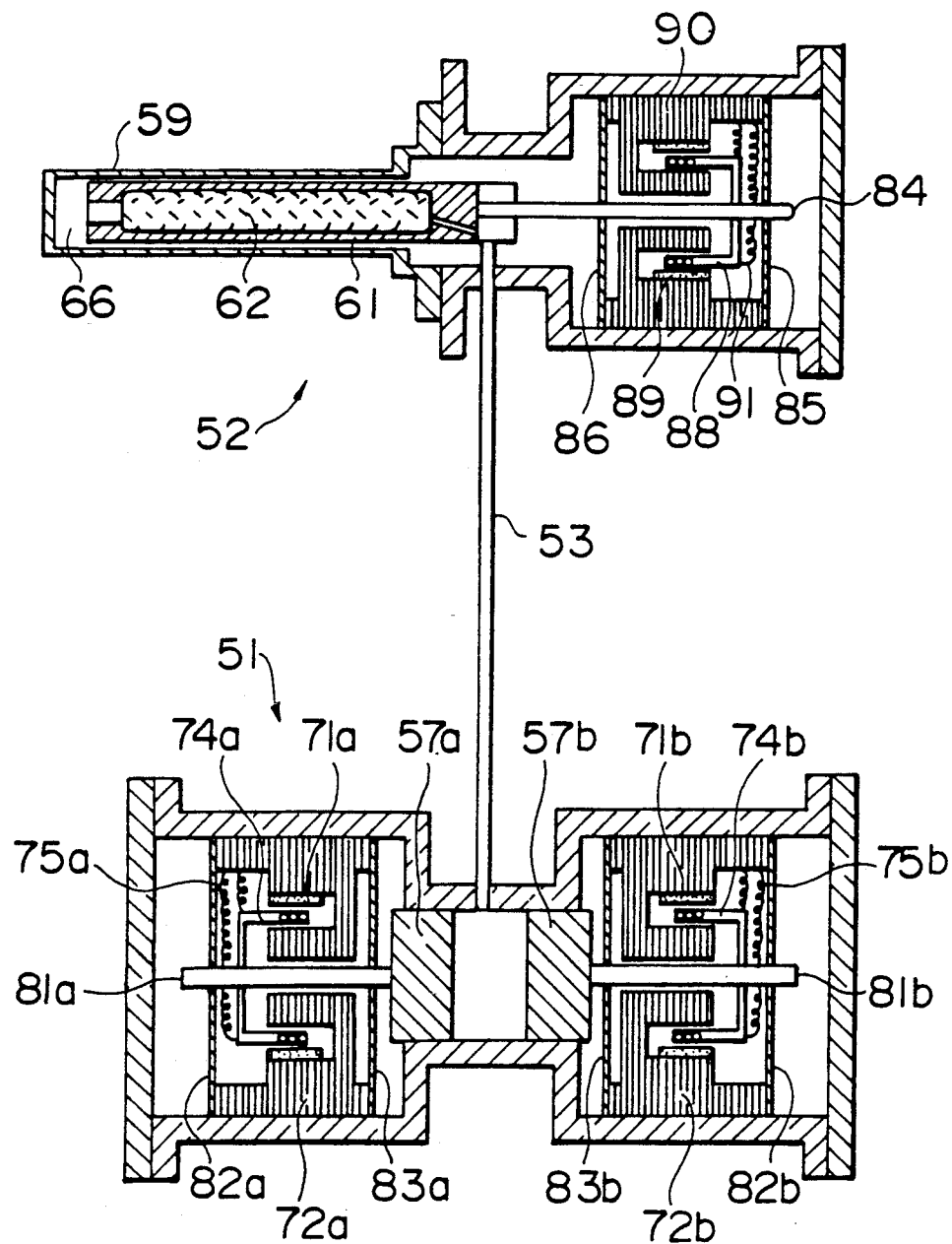
FIG. 4 is a sectional view showing the structure of a conventional Stirling refrigerator using a parallel leaf spring supporting system.

Other portions of the refrigerator may be formed as shown in FIGS. 3A, 3B and 4 which are incorporated herein by reference with their associated description.

Figure 2A:
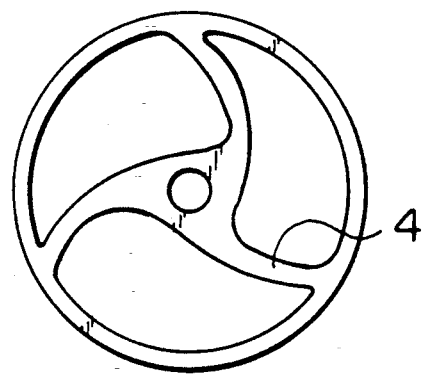
FIGS. 2A to 2C are plan views showing examples of the shape of leaf springs used in the compressor of FIG. 1.
Figure 2B:
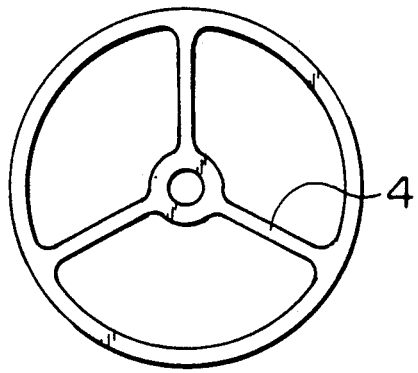
Figure 2C:
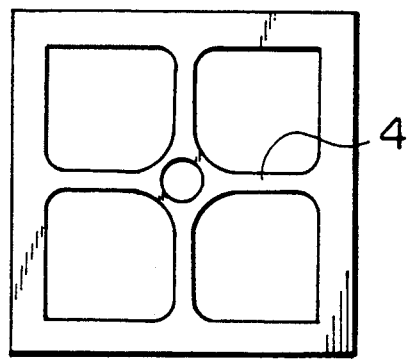

FIGS. 2A to 2C show examples of the shape of the leaf springs having slits. FIGS. 2A and 2B show examples of the structure in which the round outer circumferential portion and the inner circumferential portion of a disk-shaped leaf spring are connected to each other by three arm portions. FIG. 2C shows an example of the structure in which the rectangular outer circumferential portion and the circular inner circumferential portion of a leaf spring are connected to each other by four arm portions. It is self-evident to those skilled in the art that the shape of the leaf spring having slits or openings is not limited to the aforementioned examples.

It is preferable that each of the leaf springs 4a and 4b has a lamination structure of two leaf springs as shown in FIG. 1, so that redundancy is provided both mechanically and electrically which contribute to a long life.

When currents are supplied from the hermetic terminals 15 and 16 in the structure of FIG. 1, the currents reach the outer circumferential portions of the leaf springs 4a and 4b via the lead wires 17 and 18, are transmitted from the outer circumferential portions to the inner circumferential portions of the leaf springs 4a and 4b and finally reach the moving coil 9 via the lead wires 19 and 20. In these current paths, only supporting leaf springs are movable and deformed. In these portions, the current supply is made through the leaf springs per se. Other lead wires can be stationarily provided to improve durability. When leaf springs are used as current paths, sufficiently good electrical conducting characteristic can be provided even with thin leaf springs because the thin leaf springs may have a large area.

Although the embodiments have been shown in the case where the structure of supporting leaf springs serve also as current supply paths in a compressor, it is a matter of course that the similar structure can be adopted in a displacer driving mechanism of an expander.

Although the present invention has been described in connection with the embodiments thereof, the present invention is not limited to those embodiments. For example, it will be apparent to those skilled in the art that various substitutions, changes, modifications, combinations and improvements are possible within the scope of the appended claims.

What is claimed is:

1. A gas cycle engine for use in a refrigerator, comprising:
   a hermetic cylinder having a longitudinal direction;
   a moving member disposed in said cylinder;
   leaf spring means made of an electrical conductor for supporting said moving member so as to allow movement of said moving member in said longitudinal direction, and for supplying electric power therethrough; and
   a linear motor for moving said moving member to perform a thermodynamic gas cycle.

2. A gas cycle engine according to claim 1, further comprising electrically insulating members for holding outer circumferential portions of said leaf spring means on inner side portions of said cylinder.

3. A gas cycle engine according to claim 1, in which said leaf spring means includes at least two parallel leaf springs.

4. A gas cycle engine according to claim 3, wherein said leaf springs are each substantially flat members having a substantially round outer periphery.

5. A gas cycle engine according to claim 4, wherein said cylinder has a shape corresponding to the substantially round outer peripheral shape of said leaf springs.

6. A gas cycle engine according to claim 3, wherein said leaf springs are each substantially flat members having a substantially rectangular outer periphery.

7. A gas cycle engine according to claim 6, wherein said cylinder has a shape corresponding to the substantially rectangular outer peripheral shape of said leaf springs.

8. A gas cycle engine according to claim 3, in which said leaf springs respectively comprise at least two independent electric current paths.

9. A gas cycle engine according to claim 3, in which each of said parallel leaf springs comprises a lamination of leaf spring members.

10. A gas cycle engine according to claim 3, in which said leaf springs each have at least one opening formed therein.

11. A gas cycle engine according to claim 10, in which said leaf springs each have a plurality of openings formed therein, said openings being arranged with radial symmetry.

12. A gas cycle engine according to claim 10, wherein said leaf springs are each substantially flat members having a substantially round outer periphery.

13. A gas cycle engine according to claim 3, in which each of said parallel leaf springs is essentially made of beryllium-copper.

14. A gas cycle engine according to claim 1, further comprising electrical insulating members for holding an inner circumferential portion of said leaf spring means on said moving member.

15. A gas cycle engine according to claim 1, further comprising a clearance sealing formed between said moving member and said cylinder.

16. A refrigerator having a compressor and an expander, at least one of which includes a gas cycle engine, the gas cycle engine comprising:
a hermetic cylinder having a longitudinal direction;
a moving member disposed in said cylinder;
leaf spring means made of an electrical conductor for supporting said moving member so as to allow movement of said moving member in said longitudinal direction, and for supplying electric power therethrough; and
a linear motor for moving said member to perform a thermodynamic gas cycle.

17. A refrigerator according to claim 16, in which the gas cycle engine further comprises electrically insulating members for holding outer circumferential portions of said leaf spring means on inner side portions of said cylinder.

18. A refrigerator according to claim 17, in which said leaf spring means includes at least two parallel leaf springs.

19. A refrigerator according to claim 18, wherein said leaf springs are each substantially flat members having a substantially round outer periphery.

20. A refrigerator according to claim 19, wherein said cylinder has a shape corresponding to the substantially round outer peripheral shape of said leaf springs.

21. A refrigerator according to claim 18, wherein said leaf springs are each substantially flat members having a substantially rectangular outer periphery.

22. A refrigerator according to claim 21, wherein said cylinder has a shape corresponding to the substantially rectangular outer peripheral shape of said leaf springs.

23. A refrigerator according to claim 18, in which said leaf springs respectively comprise at least two independent electric leads.

24. A refrigerator according to claim 23, in which each of said parallel leaf springs comprises a lamination of leaf spring members.

25. A refrigerator according to claim 24, in which said leaf springs each have at least one opening formed therein.

26. A refrigerator according to claim 25, wherein said leaf springs are each substantially flat members having a substantially round outer periphery.

27. A refrigerator according to claim 25, in which said leaf springs each have a plurality of openings formed therein, said openings being arranged with radial symmetry.

28. A refrigerator according to claim 27, in which each of said parallel leaf springs is essentially made of beryllium-copper.

29. A refrigerator according to claim 28, in which said gas cycle engine further comprises electrical insulating members for holding inner circumferential portions of said leaf spring means on said moving member.

30. A refrigerator according to claim 16, in which said gas cycle engine further comprises a clearance sealing formed between said moving member and said cylinder.

* * * * *